(12) United States Patent
Fujii et al.

(10) Patent No.: US 6,568,931 B2
(45) Date of Patent: May 27, 2003

(54) EMBOSS PATTERN PROCESSING APPARATUS

(75) Inventors: Atsushi Fujii, Himeji (JP); Ryuji Moriwaki, Himeji (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/871,443

(22) Filed: May 31, 2001

(65) Prior Publication Data

US 2001/0035257 A1 Nov. 1, 2001

Related U.S. Application Data

(62) Division of application No. 08/882,192, filed on Jun. 25, 1997, now Pat. No. 6,260,887.

(30) Foreign Application Priority Data

Jun. 26, 1996 (JP) ............................................... 8-165923
Jun. 27, 1996 (JP) ............................................... 8-167236

(51) Int. Cl.[7] ............................................... B29C 59/04
(52) U.S. Cl. ....................... 425/194; 425/363; 425/373; 425/385
(58) Field of Search ................................ 425/363, 193, 425/385, 373, 194

(56) References Cited

U.S. PATENT DOCUMENTS

| 2,442,443 A | 6/1948 | Swallow |
| 2,526,318 A | 10/1950 | Battin |
| 3,496,262 A | 2/1970 | Long et al. |
| 3,681,483 A | 8/1972 | Moore |
| 3,684,348 A | 8/1972 | Rowland |
| 3,758,649 A | 9/1973 | Frattarola |
| 4,244,683 A | 1/1981 | Rowland |
| 4,359,442 A | 11/1982 | Cleminson et al. |
| 4,486,363 A | 12/1984 | Pricone et al. |
| 4,601,861 A | 7/1986 | Pricone et al. |
| 5,281,371 A | 1/1994 | Tamura et al. |
| 5,423,671 A | * | 6/1995 | Imataki ...................... 425/363 |
| 5,885,490 A | 3/1999 | Kawaguchi et al. |

FOREIGN PATENT DOCUMENTS

| EP | 0 171 975 | 2/1986 |
| GB | 2 127 344 | 4/1984 |
| JP | 60-56103 | 12/1985 |
| JP | 3-43051 | 7/1991 |
| JP | 5-17023 | 3/1993 |

* cited by examiner

Primary Examiner—James P. Mackey
(74) Attorney, Agent, or Firm—Flynn, Thiel, Boutell & Tanis, P.C.

(57) ABSTRACT

An emboss pattern processing apparatus for transferring an emboss pattern onto a thermoplastic resin sheet includes an emboss patterning roller and a lustering device having a mirror face member. The emboss patterning roller includes a roller body having a face embossed with the pattern and sealing rings attached on each side face of the roller body. The roller body and the sealing rings have a passage for flowing a cooling medium from one sealing ring through the roller body to the other sealing ring.

19 Claims, 12 Drawing Sheets

EMBOSS PATTERN PROCESSING APPARATUS

CROSS-REFERENCE TO RELATED APPLICATION

This application is a divisional of application Ser. No. 08/882,192, filed Jun. 25, 1997, now U.S. Patent No. 6,260,887 issued Jul. 17, 2001.

BACKGROUND OF THE INVENTION

1. Field of the Invention

This invention relates to a method of an emboss pattern process, emboss pattern processing apparatus, and an embossed sheet, which is used for the production of an optical precision embossed sheet, such as a reflector, a prism sheet, a fresnel lens and so on.

2. Description of the Related Art

In recent years, a reflective ability sheet (a plastic reflection sheet), undergoing a micro-prism process on the surface of a thermoplastic resin sheet, has been employed in the reflection panel field, the fashion field, an architecture field and so on.

In the United States, the use of a glass bead type and a cube corner type are approved as the aforementioned reflective ability sheet. Commonly, the reflective ability sheet of the glass bead type is superior in short-distance visibility, and the reflective ability sheet of the cube corner type is superior for long-distance visibility and luminance created by optical reflection.

In the production of the reflective ability sheet of the cube corner type, an emboss pattern on an emboss pattern forming die (or a pattern embossing die) should be precisely transferred onto the thermoplastic resin sheet.

Therefore, it is especially important that the thermoplastic resin sheet is pressed onto the emboss pattern forming die (or the pattern embossing die) with appropriate pressure, and further, the pressure is continuously added for a predetermined period of time.

As conventional methods for producing the reflective ability sheet serving the above requirement, for example, a continuously pressing method (Japanese Patent Application Publication No. Sho60-56103), a belt method (Japanese Patent Application Publication No. Hei5-17023), and a roller method (an example relating to FIG. 9 in Japanese Patent Application Publication No. Hei3-43051) are proposed.

With the continuously pressing method, emboss pattern forming dies (or pattern embossing dies) are sequentially pressed onto a sheet material of solid phase, laid on a belt and continuously supplied with plural pressing means having a heating or cooling function to transfer patterns onto the sheet material.

With the belt method, a belt having an emboss pattern and a thermoplastic resin sheet are pressed between a pair of rollers to transfer patterns onto the sheet.

With the roller method, an emboss pattern is transferred onto a sheet by using a roller forming the emboss pattern on its outer circumferential face.

According to the aforementioned continuously pressing method, the production speed is slow and apparatus is complicated and large in size.

According to the belt method, the belt itself carries the emboss pattern, so that apparatus is large in size, and a disadvantage arises concerning the endurance of the belt as a pattern embossing die.

And, according to the roller method, the production speed is faster and the endurance is better. But, the temperature of the sheet is not effectively controlled to increase when the emboss pattern is transferred onto the sheet and decreased when the sheet after being embossed is peeled from the roller, resulting in disadvantages concerning the pattern reproducibility and the peeling properties. In other words, the apparatus is not structured to have a large difference in temperature between an area of the roller where the pattern is transferred, and an area of the roller where the sheet is peeled, thus not allowing the precise pattern reproducibility and the smoothly peeling properties to be obtained.

And further, the reflective ability sheets obtained by the conventional producing methods are not satisfied in regard to the reflecting properties.

SUMMARY OF THE INVENTION

A method of an emboss pattern process according to the present invention is characterized by including the following steps of: transferring an emboss pattern onto a thermoplastic resin sheet by using an emboss patterning roller; lustering (setting a gloss on) the opposite face of the embossed face of the thermoplastic resin sheet by using a lustering means having a mirror face member; and peeling the thermoplastic resin sheet from the emboss patterning roller at a lower temperature than a temperature for transferring the emboss pattern.

It is advisable that the temperature for transferring the emboss pattern is defined to be more than the Vicat softening point of the thermoplastic resin sheet, though also depending upon the type of resin used, the temperature of the thermoplastic resin sheet before being embossed, and so on. The Vicat softening point is a softening temperature of the thermoplastic resin sheet, in which the measuring method of the above temperature is based on JIS K7206.

A difference in the temperature in the pattern transfer step and the lower temperature than that in the pattern transfer step can be properly defined, for example, more than 10° C., preferably more than 20° C., also depending on the pressure or the type of resin. The difference in temperature of less than 10° C. causes the lack of cooling ability in the peeling step, so that the precise embossed pattern cannot be obtained. The upper limit of the difference in temperature is not especially defined, but it is preferable to be less than 150° C. In the difference in temperature of more than 150° C., the endurance of the roller becomes inferior or the production speed becomes slower, resulting in higher cost.

When the thermoplastic resin sheet is lustered by the lustering means, the face-pressure is more than 0.01 MPa. If the face-pressure decreases less than 0.01 MPa, the uniformity of gloss is likely to deteriorate.

Incidentally, a thermoplastic resin film having a relatively different thickness from the then no plastic resin sheet can be used.

Emboss pattern processing apparatus according to this present invention is characterized by including: an emboss patterning roller for transferring the emboss pattern onto a thermoplastic resin sheet; a lustering means, having a mirror face member, for lustering the opposite face of the embossed face of the thermoplastic resin sheet; and a cooling means for cooling the thermoplastic resin sheet peeled from the emboss patterning roller, to a lower temperature than a temperature for transferring the emboss pattern.

In the emboss pattern processing apparatus according to the present invention, it is advisable that the emboss patterning roller has a roller body having a face for embossing a pattern; and a sealing ring attached on each side face of the roller body, in which the roller body and the sealing ring are formed with a passage for flowing a temperature controlling medium for cooling from the one sealing ring through the roller body to the other sealing ring.

As the temperature controlling medium, water, silicone oil, oil for controlling temperature, or the like can be selectively used.

According to the present invention, the passage is formed along an area of the roller body which is required to be cooled, and the temperature controlling medium with the suitable temperature is flown into the passage, thereby the temperature when the thermoplastic resin sheet is peeled off the emboss patterning roller is decreased to be lower than the temperature when the pattern is embossed. In other words, the aforementioned passage for flowing the temperature controlling medium comprises a cooling means.

The temperature controlling medium with the fixed temperature is continuously flowed from one sealing ring through the roller body to the other sealing ring, thereby allowing the temperature of the area of the roller body which is required to be cooled to be accurately controlled.

The passage in the roller body can be plural passage-tubes formed along and in the vicinity of the outer circumferential face of the roller body.

The diameter of the passage-tube and the number of passage-tubes are selectively decided so that the temperature of the area of the roller body which is required to be cooled is effectively controlled by the temperature controlling medium flown through the aforementioned passage-tubes. And, the suitable diameter of the passage-tube and the suitable number of passage-tubes may be determined according to the size of the roller used.

Where the passage-tube is a sectional circle, the inner diameter is selectively decided, preferably, for example, approximately 1 mm to 100 mm. Depending upon the temperature of the temperature controlling medium, but if the inner diameter is less than 1 mm, the sufficient flow rate cannot be obtained. But, if the inner diameter is more than 100 mm, the amount of temperature controlling medium for cooling remaining in the passage-tube increases, so that the heating efficiency in rotating the roller from the area for peeling the sheet toward the area for transferring pattern decreases. It is advisable that the sealing ring is formed therein with a groove linking to the plural passage-tubes of the all passage-tubes in the roller body.

For example, when the area of the roller body where the temperature is needed to be controlled is defined at a θ degree angle originating from the axis of the roller body, the groove can be formed to flow the temperature controlling medium into the passage-tubes in the area created by the θ degree angle. The θ degree angle is decided according to the pattern transfer speed, and is not especially limited. But where the θ degree angle is defined at an extremely small value, it is impossible to effectively control the temperature. Where the θ degree angle is defined at an extremely large value, it is difficult to control the temperature in the cooling step or the heating step when the passage for flowing the temperature controlling medium for heating is further formed in order to simultaneously carry out the cooling step and the heating step.

It is desirable that the sealing ring is formed therein with a passage for flowing a temperature controlling medium for heating in addition to the passage for flowing the temperature controlling medium for cooling; and the sealing ring is formed therein with grooves linking to the passages.

The cooling medium and the heating medium flow into the two passages, so that the heating medium flows through the area of the roller where the pattern is transferred, and the cooling medium flows through the area of the roller where the sheet is peeled, thus creating the large difference in the temperature for improving the pattern reproducibility and the peeling properties It is desirable that the degree of surface roughness of the mirror face member of the lustering means is less than 3S.

If the degree of surface roughness if more than 3S, the luminance decreases because light irregularly reflects on a non-embossed face of the thermoplastic resin sheet. Preferably, it is less than 1S.

The mirror face member can be a metal belt having the mirror face, a metal-faced elastic roller having the mirror face, or the like.

The belt is preferably made of stainless. The thickness of the belt is defined selectively, for example, 0.3 mm to 1.5 mm, preferably, 0.5 mm to 0.8 mm.

The metal-faced elastic roller has a tubular metal member located on the outer surface of the metal-faced elastic roller and a tubular elastic member located inside of the tubular metal member.

The roller body has an outer cylinder section having the face for embossing the pattern; a middle cylinder section inserted into the inside of the outer cylinder section and having the passage; and an inner cylinder section inserted into the inside of the middle cylinder section, in which the middle cylinder section has a greater linear expansion coefficient than that of the outer cylinder section, and the inner circumferential face of the middle cylinder section is formed to be a tapered shape having the same degree angle as a tapered shape of the outer circumferential face of the inner cylinder section.

The middle cylinder section is heated while being inserted into the outer cylinder section, thereby the middle and outer cylinder sections are coupled to each other because of the difference of the thermal expansion coefficients of both sections.

Further, the inner cylinder section is inserted into the middle cylinder section during the aforementioned heated expansion after the middle cylinder section is inserted into the outer cylinder section, and then the inner and middle cylinder sections are united by a shrinkage force created when the temperature of the sections returns from the high temperature to a room temperature.

In the emboss pattern processing apparatus according to the present invention, it is advisable that the roller body of the emboss patterning roller is coupled with a rotation shaft for rotating the roller body, rotation shaft to pass through the sealing rings.

More specifically, in the emboss pattern process, only the roller body is rotated and the aforementioned sealing ring is in a stationary position. Therefore, the temperature controlling medium flows into only the passage-tubes in the roller body which are linked to the groove in the stationary sealing ring by rotating the roller body.

Preferably, a heating means for heating an area of the roller before the emboss pattern is transferred is provided in the vicinity of the emboss patterning roller.

The specific example of the heating means is selectively decided, for example, an infrared heater and so on. The area of the roller where the pattern is transferred is effectively heated by the outside heating means.

The emboss pattern can be a cube corner type.

The embossed sheet according to the present invention is produced by the following method: transferring an emboss pattern onto a thermoplastic resin sheet by using an emboss patterning roller; lustering the opposite face of the embossed face of the thermoplastic resin sheet by using a lustering means having a mirror face member; and peeling the thermoplastic resin sheet from the emboss patterning roller at a lower temperature than a temperature for transferring the emboss pattern.

The conditions, as to the temperature when the emboss pattern is transferred, the temperature when the thermoplastic resin sheet is peeled from the emboss pattern roller, and so on, are the same as the conditions explained in the method for the emboss pattern process according to the present invention.

The specific type of the used thermoplastic resin is selectively decided. But where the embossed sheet is used as a plastic reflecting plate, the ideal material is an amorphous resin, such as polyvinyl chloride, polycarbonate, acryl resin (PMMA or the like), and so on, because of the high transparency and that the pattern embossed on the sheet is not easily transfigured even in the shrinkage.

And further, the thickness of the thermoplastic resin sheet is not particularly defined, but, preferably it is, for example, approximately 0.07 mm to 30 mm. If it is thinner than 0.07 mm, the pattern-transferring properties can deteriorate, and if it is thicker than 30 mm, the heating and cooling efficiency or the efficiency of production can deteriorate.

DETAILED DESCRIPTION OF THE PREFERRED EMBODIMENT(S)

First Embodiment

An emboss pattern processing apparatus 10 according to the first embodiment will be explained below with reference to FIG. 1 through FIG. 9.

Figure 1:
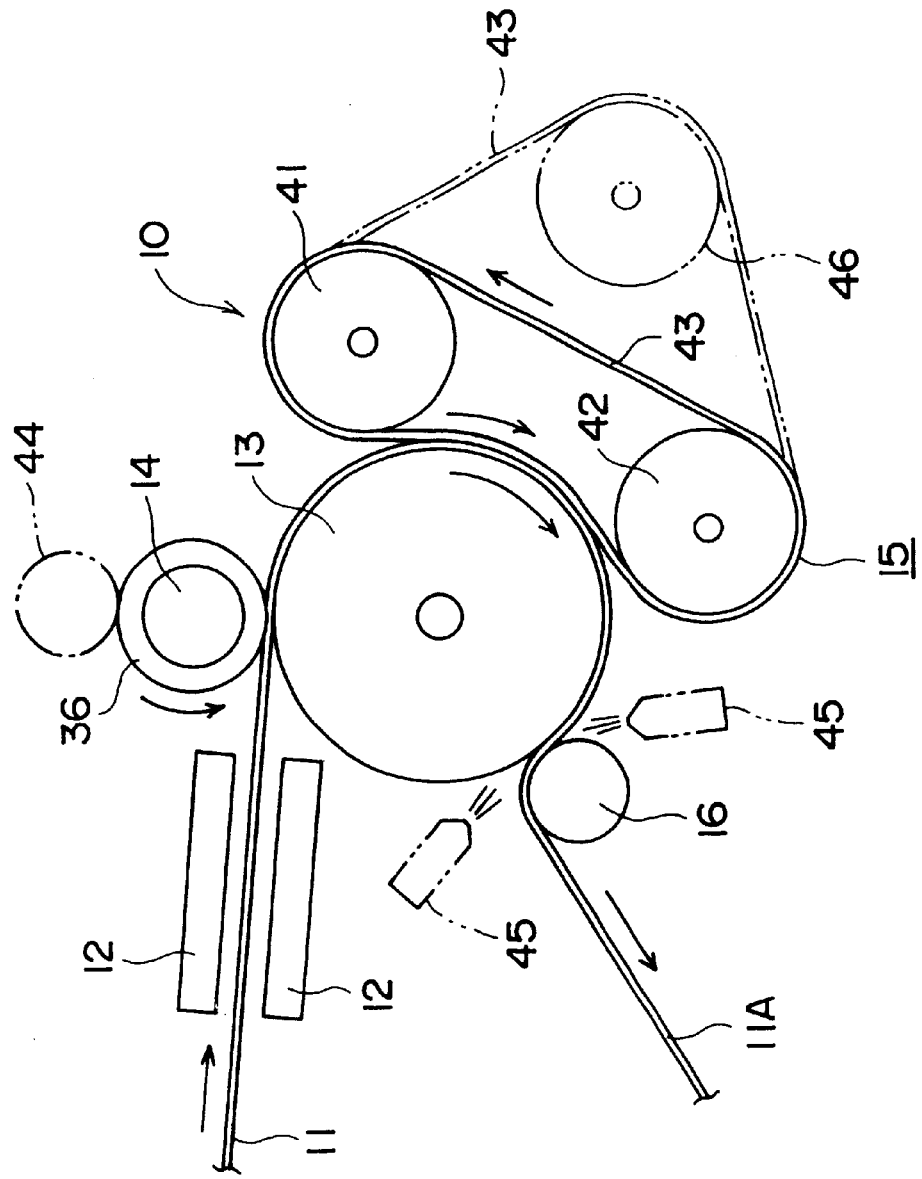
FIG. 1 is a front view of emboss pattern process apparatus relating to the preferred embodiment of the present invention.

As shown in FIG. 1, the emboss pattern processing apparatus 10 is composed of a heating means 12 for heating a thermoplastic resin sheet 11 before an emboss pattern being transferred; an emboss patterning roller 13; an elastic roller 14 promoting to transfer the emboss pattern onto the thermoplastic resin sheet 11; a lustering means 15 for lustering the opposite face of the embossed face of the thermoplastic resin sheet 11; and a peeling roller 16 peeling the thermoplastic resin sheet 11 after being embossed with the pattern.

As shown in FIG. 2 through FIG. 5, the emboss patterning roller 13 has a roller body 17 and sealing rings 18A and 18B each attached onto a side face of the roller body 17.

The roller body 17 is, in turn, composed of an outer cylinder section 19; a middle cylinder section 21 inserted into the inside of the outer cylinder section 19; and an inner cylinder section 22 inserted into the inside of the middle cylinder section 21.

Figure 6:
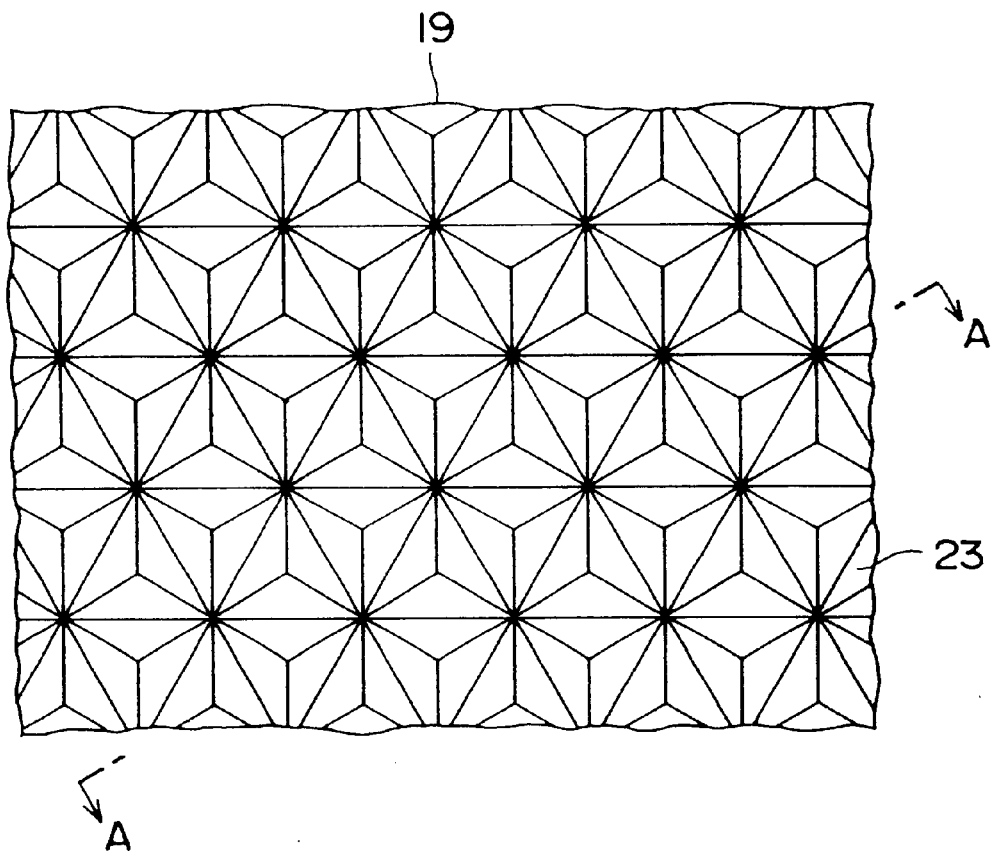
FIG. 6 is a front view of a pattern formed on the surface of an outer cylinder section.
Figure 7:
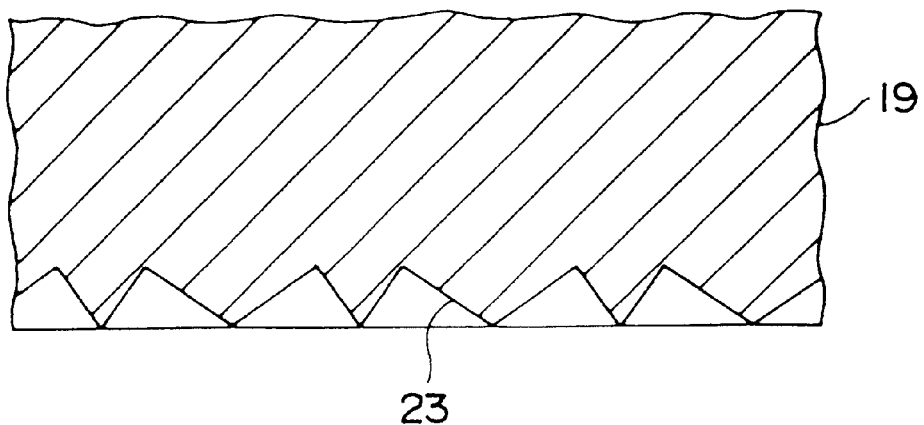
FIG. 7 is a sectional view taken along the A—A line in FIG. 6.
Figure 8:
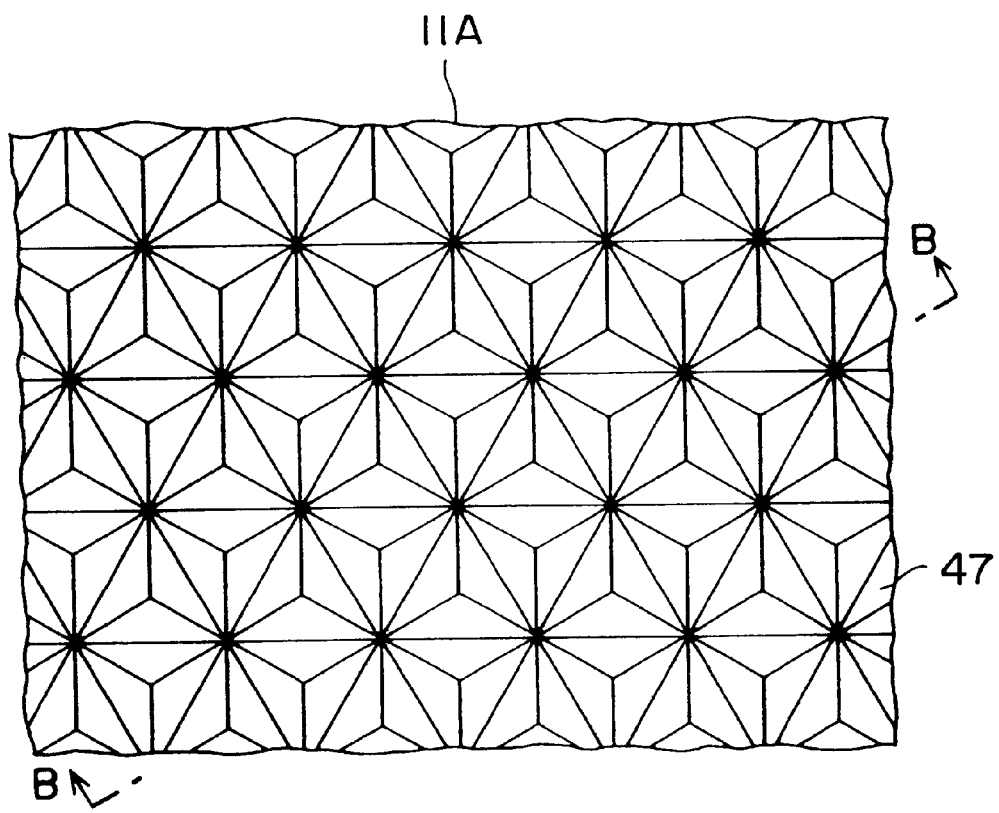
FIG. 8 is a plane view of an embossed sheet.
Figure 9:
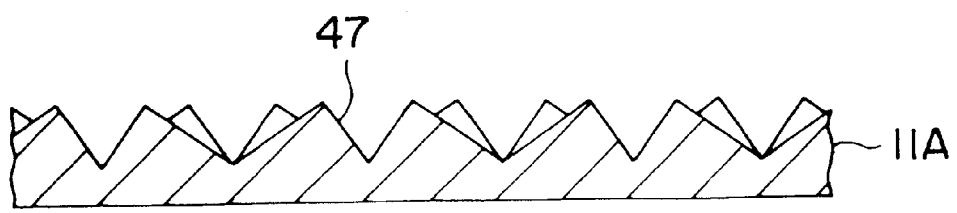
FIG. 9 is a sectional view taken along the B—B line in FIG. 8.

As shown in FIG. 6 and FIG. 7, the outer cylinder section 19 is formed on its outer surface with a pattern 23 in order to emboss the emboss pattern on the thermoplastic resin sheet 11. The pattern 23 is a triangular pyramidal diamond cut pattern of a cube corner type.

As to the middle cylinder section 21, a cutout portion 25 is formed on each outer circumferential face of opening end portions 24A and 24B, formed at both ends of the roller body 17, to engage with the sealing rings 18A and 18B, in which a female screw 26 is formed on the inner circumferential face of the opening end portion 24A. The inner circumferential face of the middle cylinder section 21 is formed to make a taper shape which the diameter of the middle cylinder section 21 is increased from the opening end portion 24A toward the opening end portion 24B. In the middle cylinder section 21, plural sectional circular passage-tubes 27 as a passage for flowing a temperature controlling medium are formed along and in the vicinity of the outer circumferential face of the middle cylinder section 21 with equidistance from one another. A linear expansion coefficient of the material used for the middle cylinder section 21 is larger than that of the outer cylinder section 19.

As to the inner cylinder section 22, it has also the outer circumeferential face formed to make a tapered-shape which the diameter of the inner cylinder section 22 increases from the opening end portion 24A toward the opening end portion 24B. The taper angle in the inner cylinder section 22 agrees with the taper angle created by the inner circumferential face of the middle cylinder section 21. A male screw 28 is formed on the outer circumferential face of the opening end portion 24B. And, the inside of the inner cylinder section 22 is hollow.

Concerning a structure of the roller body 17, the middle cylinder section 21 is heated after being inserted into the outer cylinder section 19. During the above heated expansion, the inner cylinder section 22 is screwed into the middle cylinder 21. The middle and inner cylinder sections 21 and 22 are coupled because of the difference in the thermal expansion coefficients of the sections 21 and 22, and further, are unitedly assembled by a shrinkage force created when the temperature of the sections returns from the heated temperature to a room temperature.

The inner cylinder section 22 is coupled with a hollow rotation shaft 29 to keep the section 22 and shaft 29 being linked. In the emboss pattern process, a temperature controlling medium is flown in the hollows.

Figure 5:
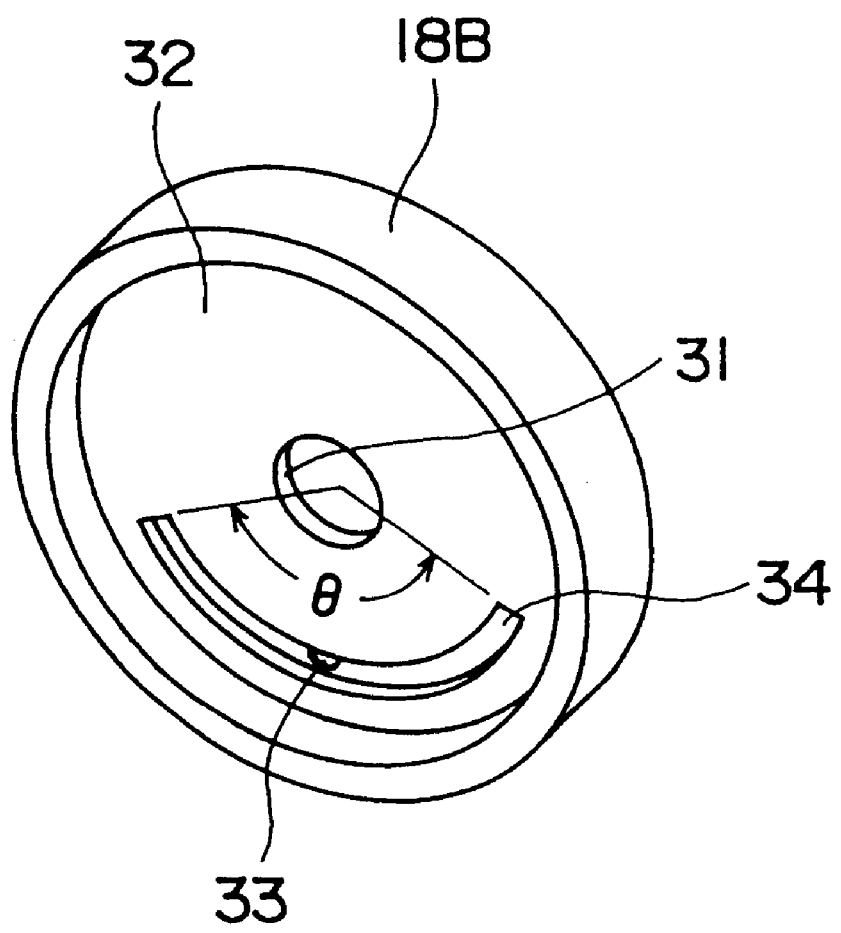
FIG. 5 is a perspective view of a sealing ring relating to the first embodiment.

As shown in FIG. 5, each of the sealing rings 18A and 18B has a hole 31 at the center to pass the rotation shaft 29. On the face of the sealing ring mounted onto each side face of the roller body 17, a circular cavity 32 is formed to engage with the cutout portion 25 of the middle cylinder section 21, in which a port 33 as the passage for flowing the temperature controlling medium is formed between the cavity 32 and the outer side face of the sealing ring. A groove 34 linking to the port 33 is formed in a circular shape in the cavity 32.

The groove 34 is formed in a size allowing the groove 34 to link to some of the passage-tubes 27 of all plural passage-tubes 27 formed in the roller body 17, when the sealing rings 18A and 18B are fitted with the roller body 17. More specifically, in controlling the temperature of the roller body 17, for example, where an area of the roller body 17 required to be cooled, is defined at a θ degree angle originating from the axis of the roller body 17, the size of the groove 34 allows the temperature controlling medium to flow into the aforementioned plural passage-tubes 27 entering the θ degree angle. The temperature controlling medium for cooling 35 flows into the above plural passage-tubes 27 linking to the groove 34, so that the area where the cooling medium 35 flows through the passage-tubes 27 is for an area where the sheet 11 is peeled from the roller body 17.

An elastic body 36, such as silicone rubber or the like, covers the surface of the elastic roller 14. The elastic body 36 is 1 mm to 50 mm thick. The elastic roller 14 is abutted on the emboss patterning roller 13 via the sheet 11 at a position where the thermoplastic resin sheet 11 is led onto the roller 13.

The lustering means 15 is composed of a first roller 41 and a second roller 42, which are provided in the vicinity of the emboss patterning roller 13, and further a metal endless belt 43 mounted onto the rollers 41 and 42. The rollers 41 and 42 are provided therein with a temperature control means and linked to a rotation driving means. The endless belt 43 is placed to press onto the opposite face of the embossed face of the sheet 11, touched onto the emboss patterning roller 13, between the rollers 41 and 42. The endless belt 43 is a mirror face having the degree of surface roughness of less than 3S.

The peeling roller 16 abuts onto the emboss patterning roller 13 via the sheet 11 at a position where the sheet 11 is peeled from the roller 13. The peeling roller 16 is located across from the elastic roller 14 on the almost opposite side of the emboss patterning roller 13.

The heating means 12 has an infrared heater and is provided to heat on both faces of the sheet 11.

Incidentally, in the processing apparatus 10, from the emboss patterning roller 13 on the opposite side of the roller 14, a cooling roller 44 can be placed to abut onto the outer circumferential face of the elastic roller 14. The surface temperature of the elastic roller 14 can be controlled by the cooling roller 44.

An air blowing device 45 can be placed in the vicinity of the peeling roller 16 to cool the sheet 11 peeled from the emboss patterning roller 13.

And further, a third roller 46 can be provided in a circle of the endless belt 43 to adjust the tension of the endless belt 43.

The emboss pattern process for the thermoplastic resin sheet 11 is carried out as the following with the use of the emboss pattern processing apparatus 10.

Figure 2:
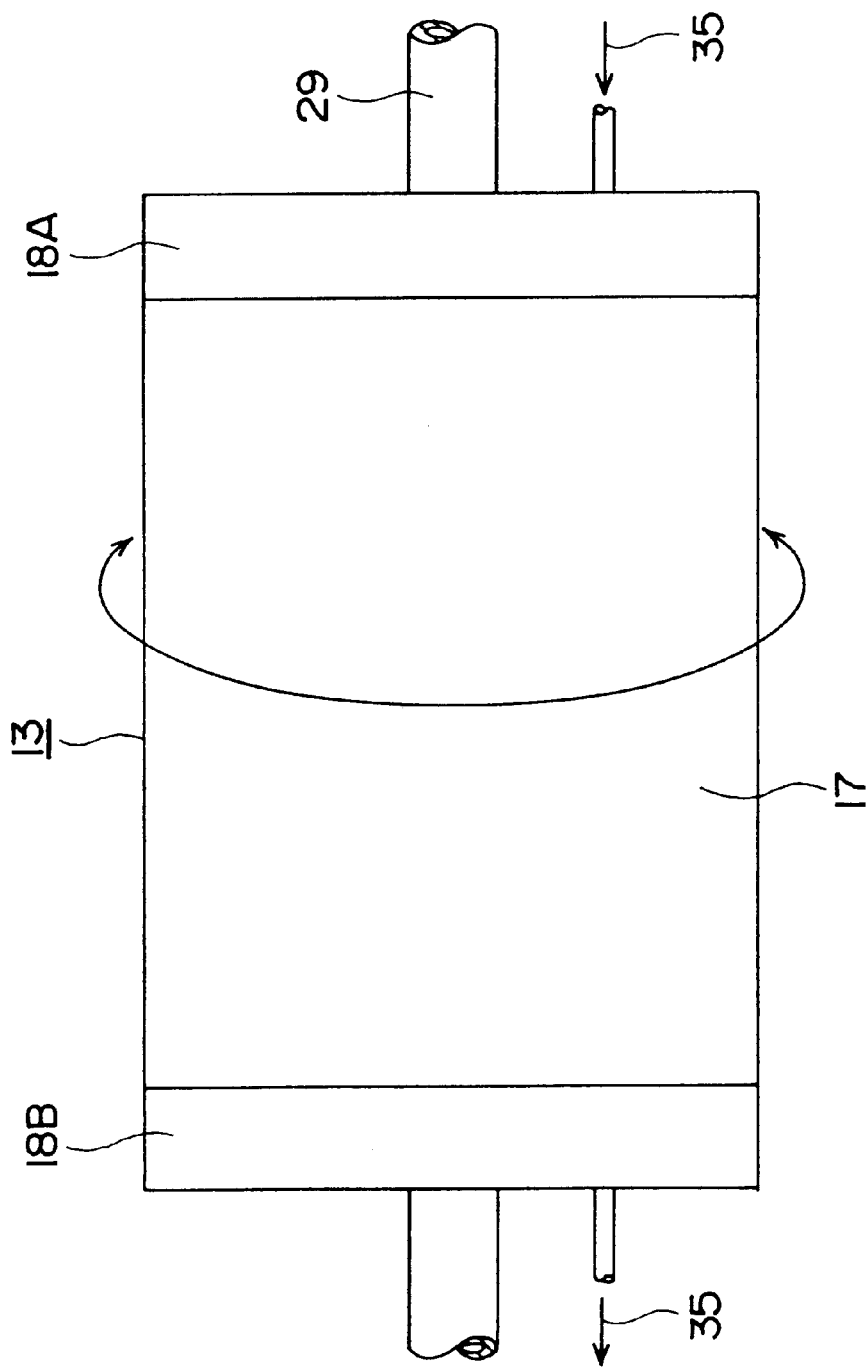
FIG. 2 is a front view of an emboss patterning roller relating to first embodiment.
Figure 3:
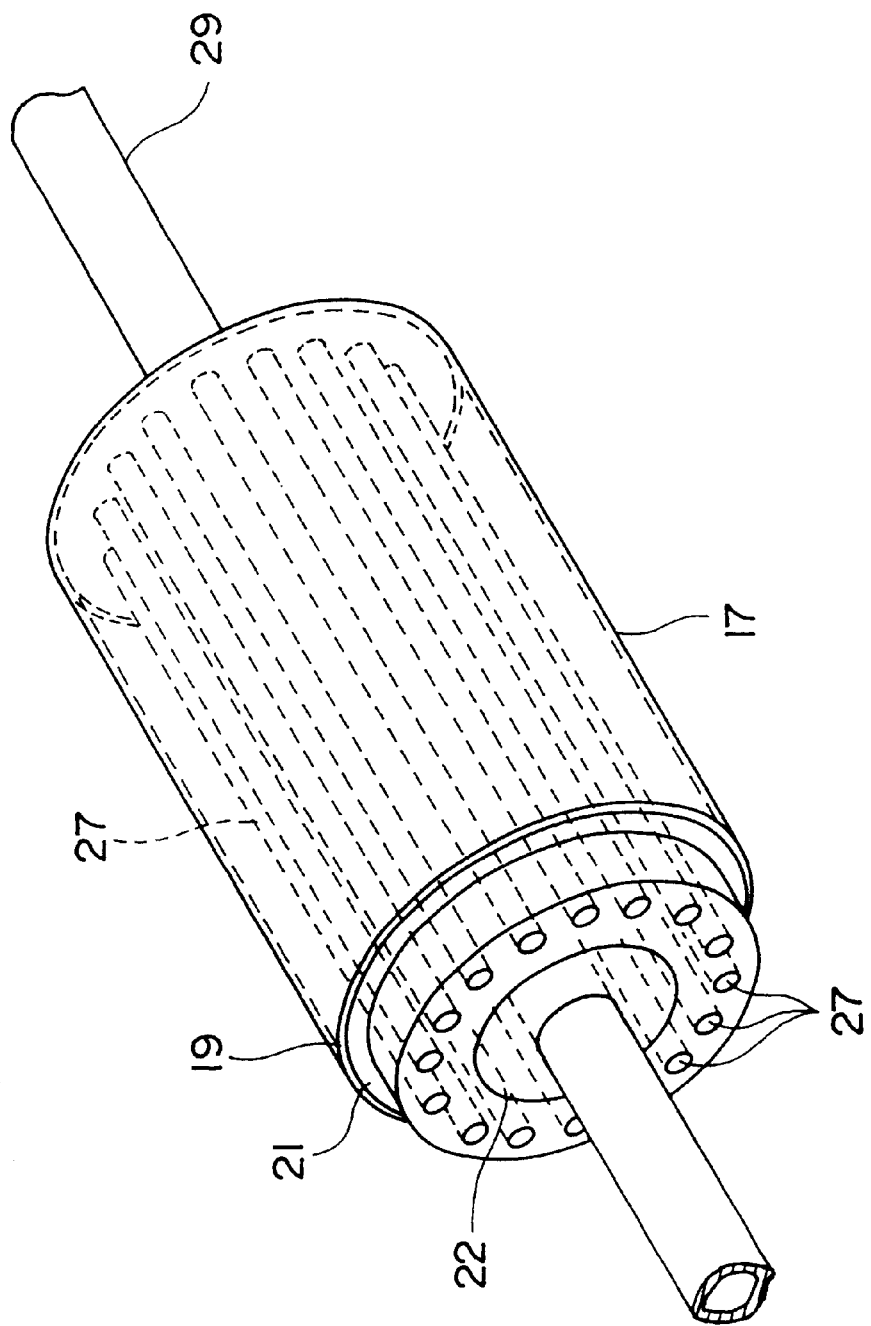
FIG. 3 is a perspective view of a roller body of the emboss patterning roller relating to the first embodiment.
Figure 4:
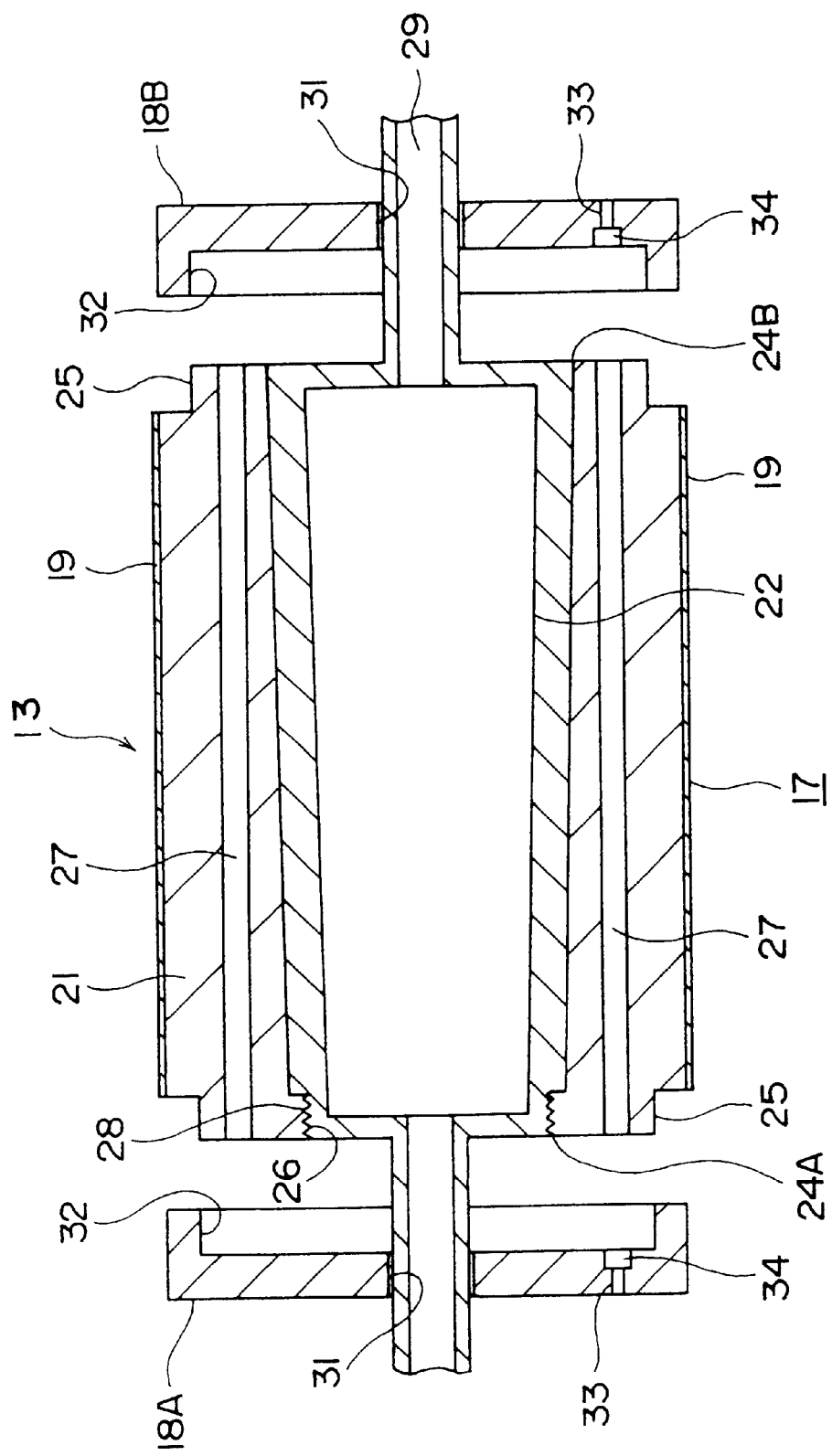
FIG. 4 is a disassemble sectional view of the emboss patterning roller relating to the first embodiment.

As shown in FIG. 1 through FIG. 3, while the roller body 17 is rotated and the endless belt 43 is run on the rollers, the thermoplastic resin sheet 11 heated by the heating means 12 is continuously supplied onto the emboss patterning roller 13. The cooling medium 35 is continuously flown from the sealing ring 18A through the passage-tubes 27 in the roller body 17 toward the sealing ring 18B.

The heatedly softened thermoplastic resin sheet 11 is face-pressed onto the roller 13 by the elastic roller 14 having the elastic body 36 to be embossed with the pattern formed on the outer cylinder section 19.

The sheet 11 after being embossed is moved with the rotation of the roller body 17, and the opposite face of the embossed face of the sheet 11 is pressed onto the mirror face of the endless belt 43 by the endless belt 43 to be transferred for the luster. The sheet 11 after being lustered is delivered to the opposite side of the roller body 17 from the elastic roller 14.

In the roller body 17, the cooling medium 35 flown into the groove 34 of the sealing ring 18A is continuously flown into the plural passage tubes 27 in the roller body 17, which are linked to the groove 34, and sequentially, discharged through the groove 34 of the sealing ring 18B. Since the cooling medium 35 with the specified temperature is continuously flown through the plural passage-tubes 27 which is located on the area where the sheet 11 is peeled from the roller body 17, the peeled area of the sheet 11 is effectively cooled. And then, the sheet 11 cooled by the cooling medium 35 is peeled from the roller body 17 by the peeling roller 15, thus obtaining an embossed sheet 11 A with an emboss pattern 47 (see FIG. 8 and FIG. 9).

Figure 10:
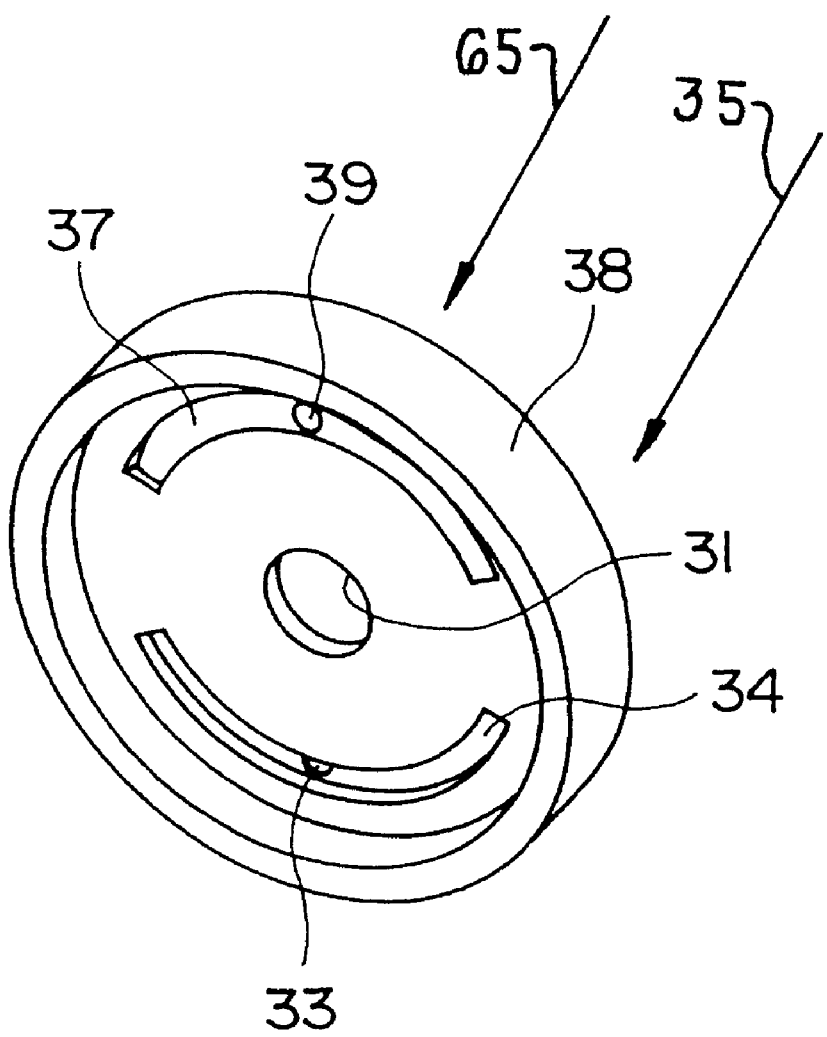
FIG. 10 is a perspective view of another structure of the sealing ring.

The sealing rings 18A and 18B according to the embodiment are each formed with the groove 34 in the cavity 32. But, as shown in FIG. 10, a sealing ring 38 can be formed to have, in addition to the groove 34, another groove 37 formed along the area where the emboss pattern on the roller body 17 is transferred onto the sheet 11. A port 39 is formed as the passage for the temperature controlling medium 35 to link to the groove 37.

In the emboss pattern processing apparatus 10 with the sealing ring 38, the temperature controlling medium for heating represented by arrow 65, flows into the plural passage-tubes 27 assigned along the area where the pattern is transferred, in order to heat the area of the roller body 17, where the pattern on the roller 17 is transferred. And further, the cooling medium represented by arrow 35, flows into the plural passage-tubes 27 at the area for peeling the sheet 11 in order to cool the area of the roller body 17 from which the sheet 11 is peeled.

Second Embodiment

Figure 11:
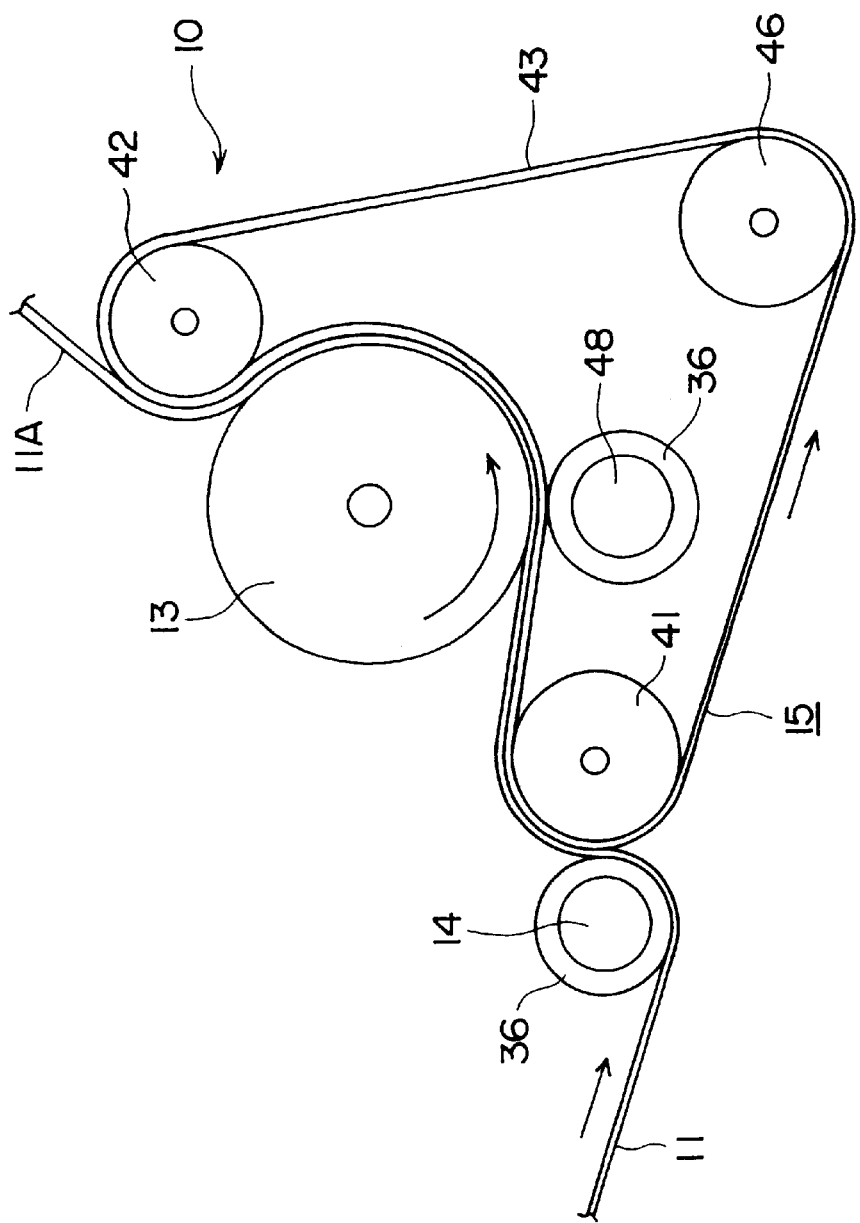
FIG. 11 is a front view of emboss pattern process apparatus relating to the second embodiment of the present invention.

An emboss pattern processing apparatus 10 according to the embodiment will be explained below with reference to FIG. 11.

A characteristic point of the emboss pattern processing apparatus 10 as compared with the processing apparatus 10 of the first embodiment is that the pattern transfer and the luster are simultaneously carried out by the endless belt 43.

More specifically, a pressing roller 48 is provided in the circle of the endless belt 43 to abut onto the emboss patterning roller 13 via the endless belt 43 and the sheet 11. The pressing roller 48 has a tubular elastic body 36 on its outer circumferential face.

The third roller 46 for adjusting the tension is provided in the circle of the endless belt 43.

The other structures of the emboss patterning roller 13, the belt 43 and so on are the same as that of the first embodiment.

In the method of the emboss pattern process with the use of the aforementioned processing apparatus 10, the sheet 11 embossed with the pattern between the emboss patterning roller 13 and the pressing roller 48 is lustered by the belt 43 while running on the outer circumferential face of the roller 13. And then, in the same way as the first embodiment, the sheet 11 is cooled at the area for peeling the sheet and peeled from the roller 13.

Third Embodiment

Figure 12:
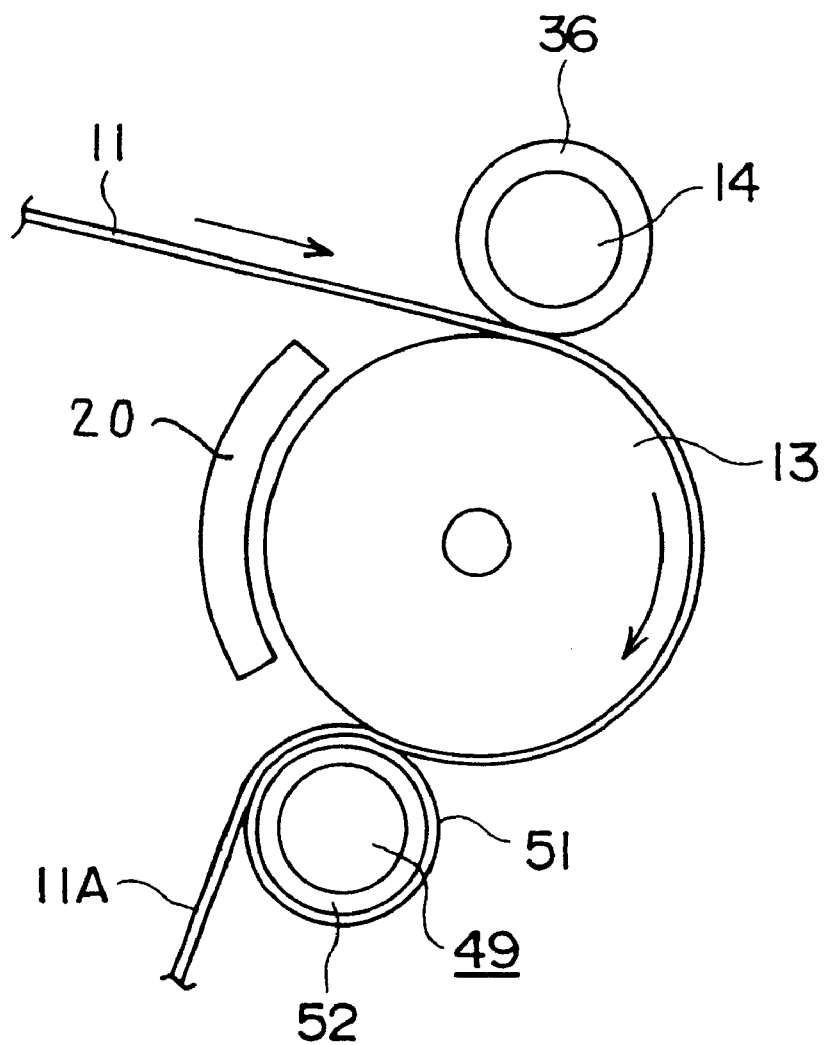
FIG. 12 is a front view of emboss pattern process apparatus relating to the third embodiment of the present invention.

An emboss pattern processing apparatus 10 relating to the third embodiment will be described below with reference to FIG. 12.

As compared with the processing apparatus 10 of the first embodiment, the characteristic points of the processing apparatus 10 in this embodiment are that a heating means 20 is provided along and in the vicinity of the outer circumferential face of the emboss patterning roller 13, and that a metal-faced elastic roller 49 replacing the endless belt 43 also serves as a peeling roller.

More specifically, the heating means 20 is provided in the vicinity of the outer circumferential face of the emboss patterning roller 13 to heat an area of the roller 13 up to the start of the pattern transfer during rotation.

The metal-faced elastic roller 49 is composed of a tubular metal member 51 on the outside and a tubular elastic member 52 located on the inside of the tubular metal member 51. The tubular metal member 51 is made of stainless and has a mirror face having the degree of surface roughness of less than 3S. The metal-faced elastic roller 49 is provided at the area for peeling the sheet 11 to be pressed onto the roller 13 through the sheet 11.

In the method of the emboss pattern process with the aforementioned processing apparatus 10, the tubular elastic member 52 of the metal-faced elastic roller 49 is elastically deformed and touched to face-pressure onto the pattern-transferred sheet 11, thereby the mirror face of the metal section 51 is transferred onto the opposite face of the embossed face of the sheet 11 and the sheet 11 is simultaneously cooled. Just after that, the sheet 11 is peeled from the roller 13.

According to the aforementioned processing apparatus 10, the area of the roller body 17, where the pattern is transferred onto the sheet, is heated by the heating means 20, and moreover, the area of the roller body 17, where the pattern is transferred, is further heated by the heating medium 35, whereby the sheet 11 is effectively heated as required for transferring the pattern.

Fourth Embodiment

Figure 13:
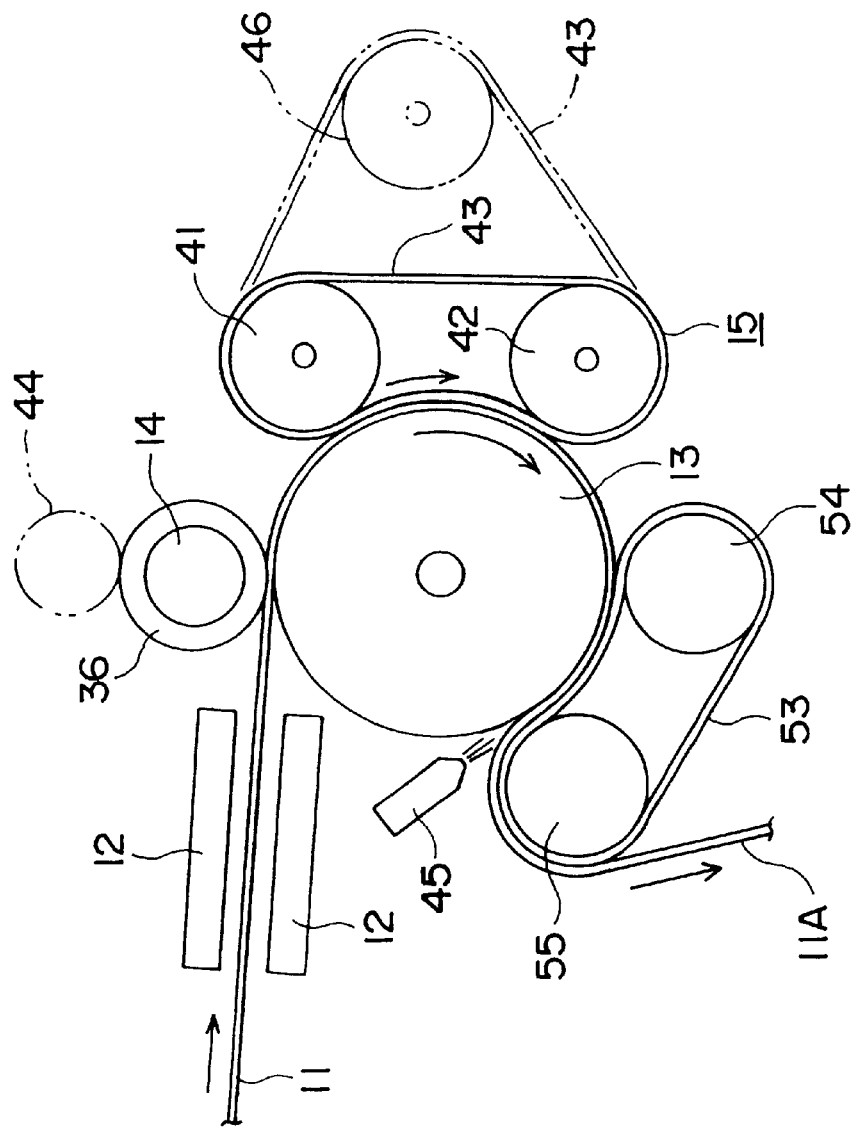
FIG. 13 is a front view of emboss pattern process apparatus relating to the fourth embodiment of the present invention.

An emboss pattern processing apparatus 10 according to the fourth embodiment will be explained with reference to FIG. 13.

As compared with the processing apparatus 10 of the first embodiment, points characterizing the processing apparatus 10 of this embodiment are that an endless belt 53 for cooling is provided and that the air blowing device 45 for cooling the sheet 11 is provided.

More specifically, the cooling endless belt 53 is mounted on fourth and fifth rollers 54 and 55 which are located in the vicinity of the emboss patterning roller 13. A part of the outer circumferential face of the endless belt 53 between the rollers 54 and 55 presses the opposite face of the embossed face of the sheet 11 touched onto the emboss patterning roller 13.

The air blowing device 45 is provided to blow air into a space between the emboss patterning roller 13 and the fifth roller 55.

In the method of the emboss pattern process with the use of the aforementioned processing apparatus 10, after the lustered sheet 11 is cooled by the cooling endless belt 53, the sheet 11 is further cooled by the air blowing device 45 and peeled from the emboss patterning roller 13.

Fifth Embodiment

Figure 14:
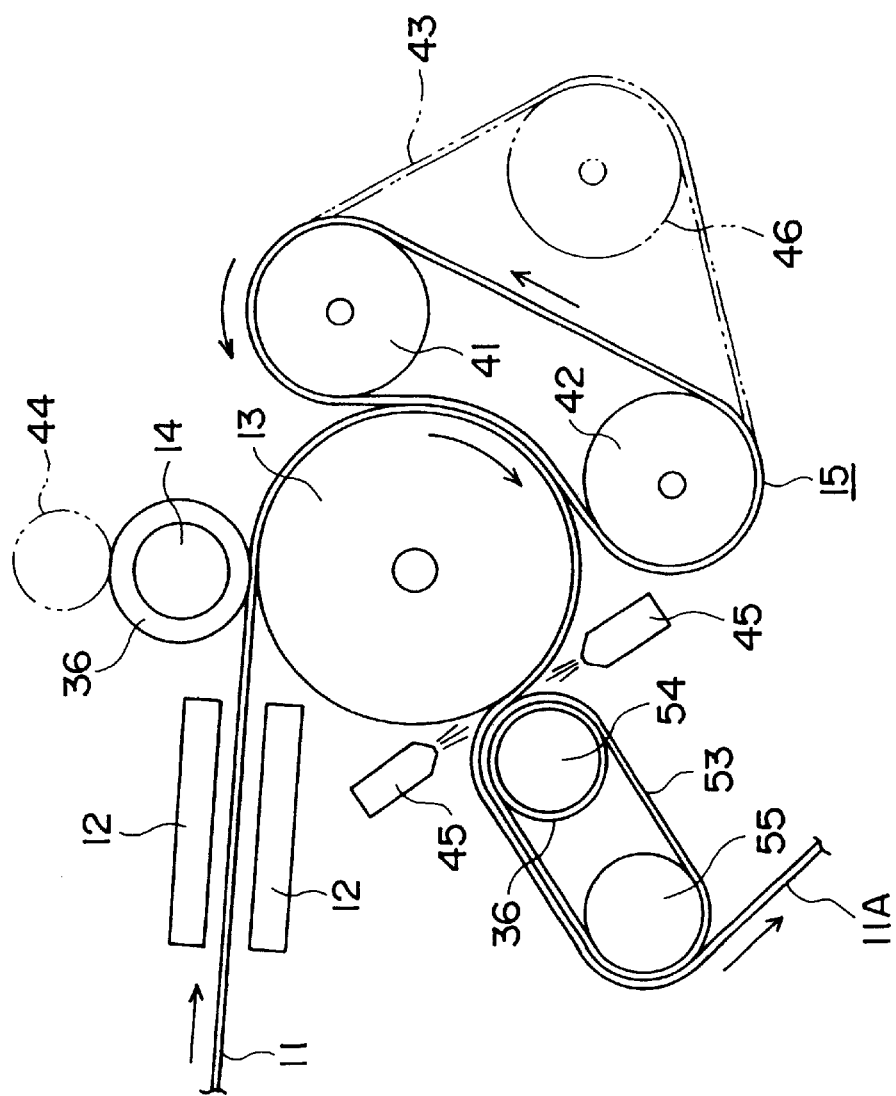
FIG. 14 is a front view of emboss pattern process apparatus relating to the fifth embodiment of the present invention.

An emboss pattern processing apparatus relating to the fifth embodiment will be explained below with reference to FIG. 14.

Different points of the processing apparatus of this embodiment from that of the fourth embodiment are the formation of the endless belt 53 for cooling and the air blowing device 45 for cooling the sheet 11.

More specifically, concerning the endless belt 53, only the fourth roller 54 is abutted on the emboss patterning roller 13 via the sheet 11, and the fifth roller 55 is located at a distance from the roller 13. The fourth roller 54 has the elastic body 36 on its outer circumferential face.

The two air blowing devices 45 are provided to blow air into a space between the emboss patterning roller 13 and the fourth roller 54 from both sides.

In the method of the emboss pattern process with the use of the aforementioned emboss pattern processing apparatus 10, the lustered sheet 11 is cooled by an area of the endless belt 53, touched onto the fourth roller 54, and the two air blowing devices 45, and peeled from the emboss patterning roller 13.

Experiment 1

As to the first embodiment, the cube corner type emboss pattern is processed onto the thermoplastic resin sheet 11 by using the following apparatus and under the following conditions.

The outer cylinder section 19 is formed by welding the mutually faced short-sides of a rectangular nickel-made plate (0.6 mm thick) by argon welding. The inner diameter in a room temperature is 143.1 mm, the face length (the length along the axis of the roller) is 220 mm.

The middle cylinder section 21 is made of aluminium (5052), and the outer diameter in a room temperature is 142.8 mm; the face length is 250 mm; the inner diameter of one opening end portion is 110.25 mm; the inner diameter of the other opening end portion is 119 mm; and the taper is one degrees.

The inner cylinder section 22 is made of stainless (SS41), and the outer diameter of one opening end portion in a room temperature is 110.55 mm; the outer diameter of the other opening end portion is 119.3 mm; the inner diameter is 50 mm; the face length is 250 mm; and the taper is one degrees.

The passage-tubes 27 are the inner diameter of 8 mm each, which are formed along and in the vicinity of the outer circumferential face of the middle cylinder section 21 with equidistance of 1 mm from one another.

The cooling medium 35 is silicone oil.

Each of the sealing rings 18A and 18B is 150 mm in diameter and 15 mm thick.

The emboss patterning roller 13 is 150 mm in diameter and 300 mm wide.

The peeling roller 15 is 50 mm in diameter.

The elastic roller 14 is 100 mm in diameter and 340 mm wide. The elastic body 36 is made of silicone resin, in which its hardness (conforming to JIS K6301 A) is 60 degrees.

The endless belt 43 is 15 mm thick and 1S of the degree of surface roughness.

The temperature in the pattern transfer step is 130° C., and the pressure (a linear pressure) is 200 N/cm.

The surface temperature of the belt in the luster step is 120° C.

The temperature of the peeling roller 15 is 15° C.

The processing speed is 1 m/min.

The thermoplastic resin sheet 11 is 0.3 mm thick, and made of polyvinyl chloride of 1,300 polymerization degrees, consisting of 50 wt % of plasticizer (DOP: di-2-ethyl hexyl phthalate).

The first roller 41 is 200 mm in diameter; 300 mm wide; and the temperature 100° C.

The second roller 42 is 200 mm in diameter; 300 mm wide; and the temperaure 30° C.

Experiment 2

As to the second embodiment, the cube corner type emboss pattern is processed onto the thermoplastic resin sheet 11 by using the same apparatus and under the same conditions as Experiment 1. As to the emboss patterning roller 13 of Experiment 2 in the same way as Experiment 1, the difference in the temperature is created between the area for transferring the pattern and the area for peeling the sheet 11 by flowing the cooling medium through the area for peeling the sheet 11.

Comparison 1

Concerning Experiment 1, the emboss pattern is processed onto the resin sheet 11 without the cooling medium 35 is flown into the roller body 17. Both of the temperatures in the pattern transfer step and the peeling step are 120° C. The other conditions are the same as Experiment 1.

Comparison 2

Concerning Experiment 1, the emboss pattern is processed onto the resin sheet 11 without the cooling medium 35 being flown into the roller body 17. Both of the temperatures for the pattern transfer step and the peeling step are 100° C. The other conditions are the same as Experiment 1.

Comparison 3

Concerning Experiment 1, the emboss pattern is processed onto the resin sheet 11 without the luster step.

As to the embossed sheets 11A obtained in Experiments 1 and 2 and Comparisons 1, 2 and 3, the reflecting properties are evaluated. The evaluation of the reflecting properties is carried out as to luminance.

The evaluated results is shown in Table 1. The evaluation relating to the reflecting properties in Table 1 is as follows: ◉ means sufficient luminance; Δ means further inferior luminance to that of the embossed sheet obtained in Experiments; and X means no luminance.

TABLE 1

|  | Experiment | | Comparison | | |
| --- | --- | --- | --- | --- | --- |
|  | 1 | 2 | 1 | 2 | 3 |
| Reflecting properties | ◉ | ◉ | X | X | Δ |

From Table 1, it is understood that the embossed sheets 11A obtained in Experiments 1 and 2 are processed through the pattern transfer step, the luster step, and the peeling step according to the present invention, thus having sufficient luminance, and naturally, the satisfying reflecting properties.

In the emboss pattern process relating to these experiments, the temperature of the area of the emboss patterning roller 13 for transferring the pattern is 130° C., whereas the temperature of the area of the roller 13 for peeling the sheet 11 is 60° C. According to these experiments, since the emboss pattern processing apparatus having the aforementioned emboss patterning roller 13 is used, it is allowed to create the difference in the temperature between the area of the roller 13 for transferring the pattern and the area of the roller 13 for peeling the sheet 11, which is required to obtain the precise pattern reproducibility and the peeling properties.

According to Comparison 1, the pattern transfer itself is precise. However, the sheet is not smoothly peeled from the roller because of the same high-temperature for peeling as that for transferring the pattern, thereby the transferred emboss pattern is transfigured.

According to Comparison 2, the temperature in the pattern transfer step is low, so that the emboss pattern is not precisely transferred onto the thermoplastic resin sheet 11.

According to Comparison 3, the luster step is not carried out to the opposite face of the embossed face of the embossed sheet, resulting in the inferior reflecting properties.

What is claimed is:

1. An emboss pattern processing apparatus, comprising:

an emboss patterning roller for transferring an emboss pattern onto a first face of a thermoplastic resin sheet;

a lustering device having a mirror face member that is positioned to press against a second face of the thermoplastic resin sheet that is opposite the first face while the thermoplastic resin sheet is against said emboss patterning roller for lustering the second face of the thermoplastic resin sheet;

a cooling device located inside said emboss patterning roller for cooling the thermoplastic resin sheet while the thermoplastic resin sheet remains against said emboss patterning roller to a lower temperature than a temperature at which the emboss pattern is transferred to the thermoplastic resin sheet wherein said cooling device is positioned to draw thermal energy away from the first face of the thermoplastic resin sheet towards the emboss patterning roller after the emboss pattern is transferred to the thermoplastic resin sheet; and a peeling device for removing the cooled thermoplastic resin sheet from said emboss patterning roller.

2. The emboss pattern processing apparatus according to claim 1, wherein said emboss pattern roller includes a roller body having an annular face with an embossing pattern, side faces located at opposed ends of said annular face and sealing rings attached to each said side face of said roller body, said roller body and said sealing rings having a passage for flowing a temperature controlling fluid for cooling the thermoplastic resin sheet extending from a first one of said sealing rings, through said roller body to a second one of said sealing rings, said sealing rings being configured to remain stationary during rotation of said emboss patterning roller.

3. The emboss pattern processing apparatus according to claim 2, wherein said passage in said roller body includes plural passage-tubes formed adjacent said annular face of said roller body.

4. The emboss pattern processing apparatus according to claim 3, wherein each said sealing ring is formed with a first groove for receiving a temperature cooling fluid and linking to some of said passage-tubes and less than all of said passage-tubes in said roller body.

5. The emboss pattern processing apparatus according to claim 4:

wherein each said sealing ring is formed therein with a second groove for receiving a temperature heating fluid and linking to some of said passage-tubes in said roller body.

6. The emboss pattern processing apparatus according to claim 1, wherein said mirror face member of said lustering device has a degree of surface roughness of less than 3S.

7. The emboss pattern processing apparatus according to claim 1, wherein said mirror face member of said lustering device is formed by a metal belt.

8. The emmboss pattern processing apparatus according to claim 2, wherein said roller body comprises:

an outer cylinder section that defines the annular face having the embossing pattern;

a middle cylinder section which is inserted inside the outer cylinder section and that defines the passage of said roller body; and an inner cylinder section inserted inside the middle cylinder section, wherein the outer cylinder section and the middle cylinder section each have a linear coefficient of expansion such that the coefficient of thermal expansion of the outer cylinder section is greater than the coefficient of expansion of the middle cylinder section; and wherein the middle cylinder section has an inner circumferential face with a tapered profile, the inner cylinder section having an outer circumferential face with a tapered profile so that the angle of taper of the inner circumferential face of the middle cylinder section and the angle of taper of the outer circumferential face of said inner cylinder section are the same so that the faces are in surface-to-surface contact.

9. The emboss pattern processing apparatus according to claim 2, wherein said roller body is coupled to a rotation shaft that rotates said roller body and said rotation shaft extends through said stationary sealing rings.

10. The emboss pattern processing apparatus according to claim 1, further comprising a heater for heating a portion of said emboss patterning roller before the thermoplastic resin sheet is applied to said emboss patterning roller and said heater is located in the vicinity of said emboss patterning roller.

11. The emboss pattern processing apparatus according to claim 1, wherein said emboss patterning roller is shaped to transfer a cube corner type emboss pattern to the thermoplastic resin sheet.

12. The emboss pattern processing apparatus of claim 1, wherein said lustering device includes an endless belt that forms said mirror face and a plurality of rollers for urging said endless belt against the second face of the thermoplastic resin sheet and said emboss patterning roller.

13. The emboss pattern processing apparatus of claim 12, wherein one of said rollers of said lustering device functions as said peeling device.

14. The emboss pattern processing apparatus according to claim 1, further including a supplemental roller positioned to abut against the thermoplastic resin sheet and said emboss patterning roller, wherein said supplemental roller has an outer face that functions as said mirror face of said lustering device and said supplemental roller functions as said peeling device.

15. An embossing pattern apparatus comprising:

an emboss pattern roller for transferring an emboss pattern onto a first face of a thermoplastic sheet, said emboss pattern roller including a roller body having an annular face with an embossing pattern and an inner structure enabling sequential cooling of portions of the annular face of said emboss pattern roller;

a pressing roller for pressing against said emboss pattern roller to form the embossed pattern on the first face of the thermoplastic sheet; and a peeling roller for peeling the thermoplastic sheet from said emboss pattern roller, wherein said inner structure of said roller body provides cooling of portions of the annular face of said emboss pattern roller only in the vicinity of said peeling roller.

16. The emboss pattern processing apparatus according to claim 15, wherein the inner structure of said roller body enables sequential heating only of portions of the annular face of said emboss pattern roller that are adjacent the area where the emboss pattern is transferred onto the thermoplastic sheet.

17. The emboss pattern processing apparatus according to claim 15, wherein the inner structure of said roller body comprises a plurality of passages spaced equidistantly from and parallel to a central axis of said roller body, said passages extending the length of said roller body.

18. The emboss pattern processing apparatus according to claim 17, wherein said emboss pattern roller includes sealing rings at opposing side faces of said roller body, said sealing rings remaining stationary during rotation of said roller body.

19. The emboss pattern processing apparatus according to claim 18, wherein each of said sealing rings include a groove and an aperture for receiving a cooling medium therein, said grooves being in alignment with each other across said roller body such that movement of said passages with said roller body provides a path to receive a cooling medium only through the passages that are in alignment with the grooves of said sealing rings.

* * * * *